(12) United States Patent
Guiliano (10) Patent No.: US 9,357,875 B1
(45) Date of Patent: Jun. 7, 2016

(54) COMBINATION OUTDOOR COOKING AND FIREWOOD SUPPORT APPARATUS

(76) Inventor: Salvatore Guiliano, Riverside, CA (US)

( * ) Notice: Subject to any disclaimer, the term of this patent is extended or adjusted under 35 U.S.C. 154(b) by 219 days.

(21) Appl. No.: 13/528,213

(22) Filed: Jun. 20, 2012

Related U.S. Application Data

(60) Provisional application No. 61/499,524, filed on Jun. 21, 2011.

(51) Int. Cl.
*A47J 33/00* (2006.01)
*A47J 36/26* (2006.01)

(52) U.S. Cl.
CPC . *A47J 33/00* (2013.01); *A47J 36/26* (2013.01)

(58) Field of Classification Search
CPC .................................. A47J 33/00; A47J 36/26
USPC ......... 126/1 R, 25 R, 29, 59, 30, 94, 9 R, 9 B
See application file for complete search history.

(56) References Cited

U.S. PATENT DOCUMENTS

| | | | | |
|---|---|---|---|---|
| 955,140 | A * | 4/1910 | Cronk | 126/30 |
| 1,491,080 | A * | 4/1924 | Clark | 126/29 |
| 1,617,806 | A * | 2/1927 | Hanson | 126/38 |
| 2,003,974 | A * | 6/1935 | Pearson | 126/25 R |
| 2,631,579 | A * | 3/1953 | Metzger | 126/29 |
| 2,839,043 | A * | 6/1958 | La Born | 126/30 |
| 3,191,592 | A * | 6/1965 | Lorbacher | 126/25 A |
| 3,389,651 | A * | 6/1968 | Schultz | 99/393 |
| 3,503,324 | A * | 3/1970 | Gmeiner | 99/393 |
| 3,610,225 | A * | 10/1971 | Schwantes | 126/25 R |
| 3,719,181 | A * | 3/1973 | Porter, Jr. | 126/30 |
| 4,200,085 | A * | 4/1980 | Buehl | 126/9 B |
| 4,210,118 | A * | 7/1980 | Davis et al. | 126/25 R |
| 4,393,857 | A * | 7/1983 | Sanford | 126/9 R |
| 4,488,535 | A * | 12/1984 | Johnson | 126/25 A |
| 4,492,215 | A * | 1/1985 | DiGianvittorio | 126/9 R |
| 4,621,608 | A * | 11/1986 | Lee | 126/9 R |
| 4,732,138 | A * | 3/1988 | Vos | 126/25 A |
| 4,829,975 | A * | 5/1989 | Hait | 126/9 R |
| 4,896,650 | A * | 1/1990 | Hait | 126/9 R |
| 5,179,932 | A * | 1/1993 | DeCarlo | 126/9 R |
| 5,287,800 | A * | 2/1994 | Orednick | 99/449 |
| 5,713,344 | A * | 2/1998 | Gilbert | 126/29 |
| 5,913,270 | A * | 6/1999 | Price | 108/101 |
| 6,626,090 | B2 * | 9/2003 | McLemore et al. | 99/340 |
| 6,711,993 | B2 * | 3/2004 | Robertson | 99/448 |
| 6,719,250 | B2 * | 4/2004 | FitzSimons | 248/166 |
| 6,945,243 | B1 * | 9/2005 | Walker et al. | 126/9 R |
| 7,856,924 | B1 * | 12/2010 | Stihi | 99/419 |
| 8,151,784 | B2 * | 4/2012 | Czajkoski | 126/30 |
| 8,316,837 | B2 * | 11/2012 | Malumyan | 126/25 R |
| 2003/0015186 | A1 * | 1/2003 | McDonald | 126/9 R |

(Continued)

*Primary Examiner* — Avinash Savani
*Assistant Examiner* — Aaron Heyamoto
(74) *Attorney, Agent, or Firm* — Knobbe, Martens, Olson & Bear, LLP (57) ABSTRACT

Disclosed herein is a combination outdoor cooking and firewood support apparatus having a frusto-conical frame designed to support firewood in a substantially upright orientation along a periphery of the frame in a manner such that the firewood lean toward the center of the frame. A cooking grate can be positioned on the upper end of the frame over the interior area so that food can be cooked over heat generated by the leftover coal from the burnt firewood that fell into the interior area of the frame. The apparatus can be collapsed into a flattened configuration when some of the arms are detached from at least one of the frame members while other arms remain attached to the frame members.

10 Claims, 9 Drawing Sheets

(56) References Cited

U.S. PATENT DOCUMENTS

| | | | |
|---|---|---|---|
| 2004/0123857 A1* | 7/2004 | Viraldo | 126/9 R |
| 2005/0229916 A1* | 10/2005 | Fitzgerald | 126/25 R |
| 2005/0247297 A1* | 11/2005 | Wilfer | 126/9 R |
| 2005/0274372 A1* | 12/2005 | Knight | 126/9 R |
| 2006/0048766 A1* | 3/2006 | Viers | 126/25 AA |
| 2006/0102163 A1* | 5/2006 | Sanders et al. | 126/30 |
| 2006/0180139 A1* | 8/2006 | Proffitt et al. | 126/25 R |
| 2006/0272630 A1* | 12/2006 | Sanders et al. | 126/9 R |
| 2007/0199555 A1* | 8/2007 | Gregory | 126/9 R |
| 2010/0089249 A1* | 4/2010 | Giangrasso et al. | 99/447 |
| 2010/0326423 A1* | 12/2010 | Dupont | 126/540 |
| 2012/0070556 A1* | 3/2012 | Wilson et al. | 426/523 |
| 2012/0085342 A1* | 4/2012 | Lush | 126/9 R |
| 2013/0269674 A1* | 10/2013 | Junge, Sr. | 126/30 |
| 2013/0298895 A1* | 11/2013 | Robb | 126/25 R |

\* cited by examiner

COMBINATION OUTDOOR COOKING AND FIREWOOD SUPPORT APPARATUS

CROSS-REFERENCE TO RELATED APPLICATIONS

This application claims the benefit of priority under 35 U.S.C. §119(e) of U.S. Provisional Application No. 61/499,524 filed on Jun. 21, 2011, which is incorporated herein by reference in its entirety.

BACKGROUND OF THE INVENTION

1. Field of the Invention

This disclosure relates generally to outdoor cooking and fire building apparatus.

2. Description of the Related Art

Fire rings are generally circular enclosures used to contain the fire to within a fire site when building a fire at the beach, camp ground, or other outdoor locations. Typically, firewood logs are arranged inside the fire ring in an inverted cone or teepee configuration before the fire is ignited. This arrangement ensures that the wood burning surfaces are exposed to oxygen. However, as the wood burns down, individual wood pieces tend to collapse on top of one another and extinguish the fire underneath by cutting off the oxygen supply. As such, it may be difficult to keep the fire going when using a conventional fire ring. Moreover, it is often desirable to barbeque or cook over a campfire. However, there is no simple suitable way to place a cooking grill over a campfire. Furthermore, many campfire cookers and barbeques have bulky structures that are inconvenient to store and transport. Thus, there is a need for an improved apparatus and method for building outdoor fires and cooking over the fire.

SUMMARY OF THE INVENTION

The apparatus, systems, and methods of the invention each have several aspects, no single one of which is solely responsible for its desirable attributes. Without limiting the scope of this invention, its more prominent features will now be discussed briefly.

A preferred embodiment of the apparatus of the present invention provides a dual function firewood support and outdoor cooking apparatus. The apparatus comprises a frame adapted to support firewood in a substantially upright orientation along the periphery of the frame, and a cooking grate disposed on top of the frame. In one embodiment, the frame has a generally frusto-conical configuration and can be collapsed into a flattened configuration. In another implementation, the frame comprises an upper ring and a lower ring, the upper ring being smaller in diameter than the lower ring. Firewood can be placed along the periphery of the lower ring and leaned against the upper ring. This configuration enables smoldering coal from burnt wood to drop toward a center space defined by the rings, which in turn can be used to cook or barbecue food on the cooking grate. In other implementations, the lower and upper ring members of the frame can comprise other shapes or configurations, such as rectangular, triangular, or square.

Another preferred embodiment of the apparatus of the present invention comprises a frame having an upper ring member, a lower ring member, and a plurality of arms joining the upper and lower ring members in a manner such that the ring members are arranged in a parallel spaced apart relationship. Preferably, the frame is adapted to support firewood in a substantially upright orientation along the periphery of the ring members. The apparatus further comprises a cooking grate adapted to be positioned on an upper surface of the frame over the interior area defined by the frame. In a preferred implementation, at least some of the arms are detachable from the upper ring member in a manner such that the frame can be flattened into a retracted configuration when not in use. In another preferred implementation, at least some of the arms are fixedly attached to one of the upper and lower ring members so that the arms will not be misplaced when the apparatus is in a retracted configuration. In yet another preferred implementation, at least some of the arms are fixedly attached to both the upper and lower ring members while at least some of the other arms are removably attached to one of the upper and lower ring members. In some embodiments, the apparatus further comprises a plurality of legs extending outwardly from the lower ring member. Preferably, the legs are rotatably coupled to the lower ring member such that each leg can be rotated upward when the frame is in a retracted configuration.

Another preferred embodiment of the apparatus of the present invention comprises a combination outdoor cooking and firewood support apparatus which comprises a frame having a frusto-conical configuration adapted to support firewood in a substantially upright orientation along a periphery of the frame. The frame includes an upper frame member, a lower frame member, and a plurality of arms joining the upper and lower frame members. The arms can be rotatably attached to the upper and lower frame members such that there is flexibility in moving the arms relative to the frame members without removing them. In one implementation, the upper and lower frame members together define an interior area and are arranged in a spaced apart relationship, preferably in a parallel space apart relationship, so that there is an opening between them. In some implementations, the frame can be retracted into a flattened configuration whereby at least some of the arms are detached from at least one of the frame members. In some other implementations, at least some of the arms are fixedly attached to the frame members even when the frame is in a flattened configuration. In other implementations, the apparatus further comprises a cooking grate wherein the cooking grate is adapted to be positioned on an upper surface of the frame over the interior area of the apparatus. In yet other implementations, the apparatus further comprises a plurality of legs that are rotatably coupled to the lower frame member and engage with the lower end of the arms.

Another preferred embodiment of the apparatus of the present invention comprises a combination outdoor cooking and firewood support apparatus which comprises a frame adapted to support firewood in a substantially upright orientation along the periphery of the frame such that the firewood leans inwardly toward the center of the frame. The apparatus further comprises a cooking grate adapted to be positioned on an upper surface of the frame over the interior area. Preferably, the frame can be flattened into a retracted configuration when the apparatus is not in use. In one embodiment, the frame comprises an upper ring and a lower ring where the upper and lower rings are connected together in a spaced apart relationship by a plurality of arms. In another embodiment, at least some of the arms are fixedly attached to one of the upper and lower rings and removably attached to the other one of the upper and lower rings.

DETAILED DESCRIPTION OF THE PREFERRED EMBODIMENT

Figure 1:
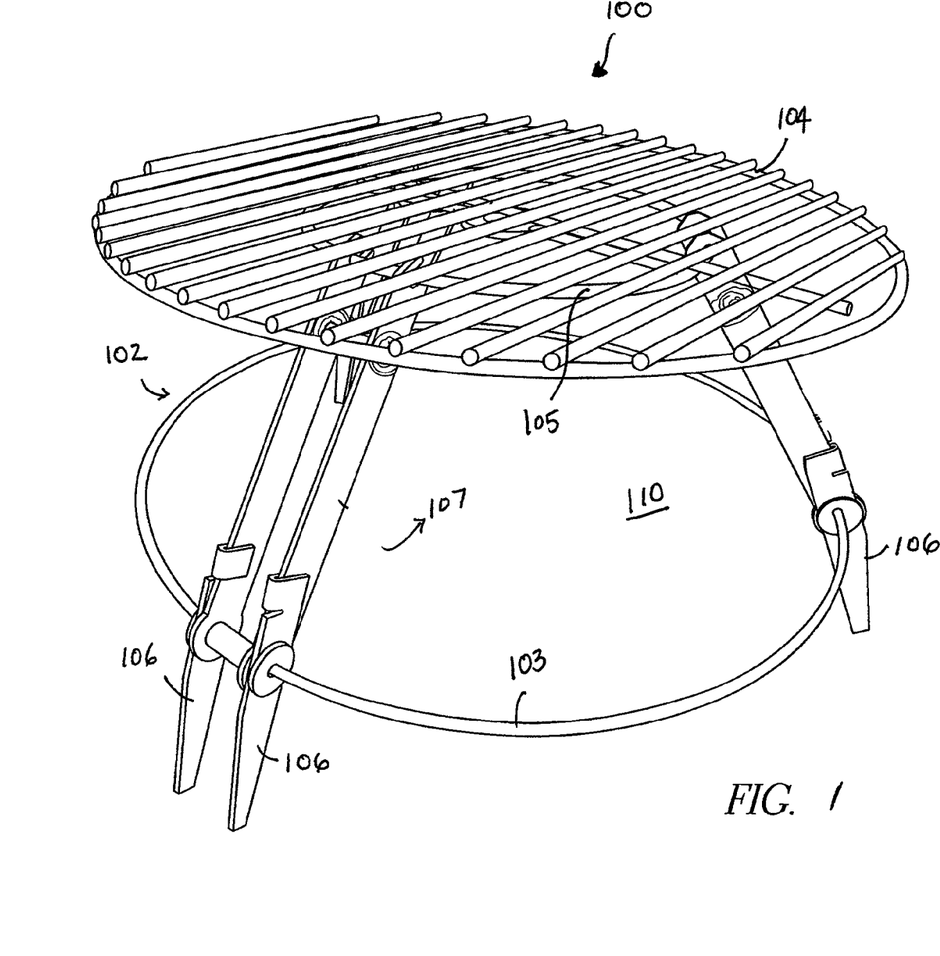
FIG. 1 illustrates an outdoor cooking and firewood support apparatus according to one embodiment of the present invention.

FIG. 1 illustrates a combination outdoor cooking and firewood support apparatus 100 according to one embodiment of the present invention. As shown in FIG. 1, the apparatus 100 generally includes a frame 102 adapted to support firewood in a substantially upright position, a cooking grate 104 disposed on top of the frame 102, and a plurality of legs 106 adapted to keep the firewood elevated from the ground. In some embodiments, the frame 102 has a generally frusto-conical configuration and provides surfaces for supporting the firewood around the periphery of the frame 102 in a manner such that the firewood leans toward the center of the frame 102 over an interior area defined by the frame. In one implementation, the frame 102 includes a lower support surface 103 for a lower portion of the firewood to rest on and an upper support surface 105 for an upper portion of the firewood to lean against. In another implementation, the frame 102 further includes openings 107 configured so that burnt wood would fall naturally through the opening 107 and accumulate in an interior area 110 bound by the frame 102.

As described in greater detail below, the apparatus 100 is designed to support firewood in a substantially upright position around the periphery of the frusto-conical frame to facilitate burning of the wood and addition of logs to the fire. The apparatus is also designed to allow coal from the burnt wood to fall naturally into the interior area 110 located at the center of the apparatus to be used for heating food and drinks placed on the cooking grate 104. In a preferred implementation, the apparatus 100 can be collapsed into a flattened configuration for ease of storage and transportation.

Figure 2:
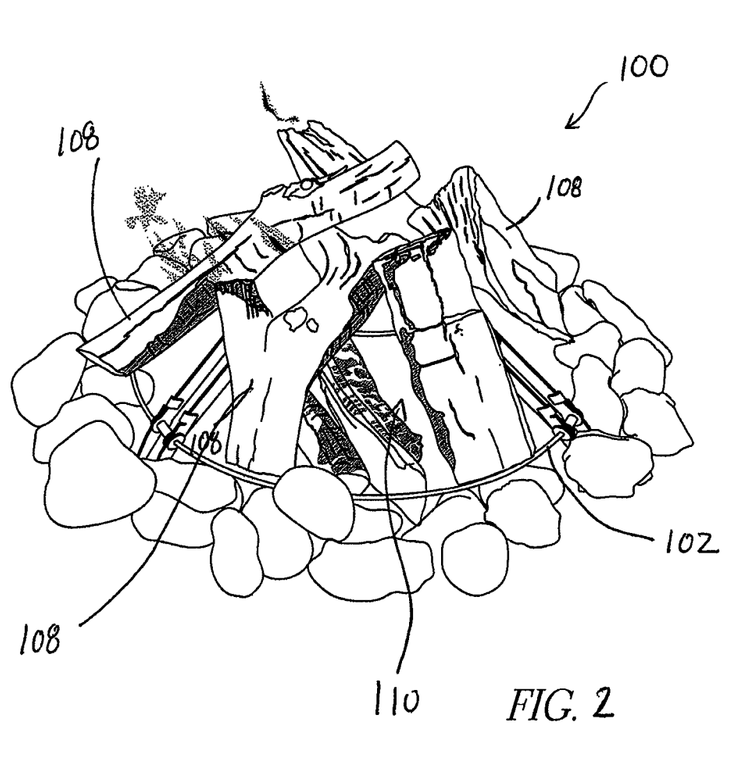
FIG. 2 illustrates the outdoor cooking and firewood support apparatus of FIG. 1 shown without the cooking grate.

FIG. 2 illustrates the apparatus 100 in use without the cooking grate. As shown in FIG. 2, firewood logs 108 are positioned along the outer periphery of the frame 102 in a substantially upright position so that wood burning surfaces are exposed to oxygen. The firewood logs 108 lean against the frame 102, which substantially reduces the likelihood of the logs falling on top of one another as the wood burns. The design of the frame 102 also makes it easier to add additional firewood logs to the fire. Further, the design of the frame 102 allows smoldering coal from the burnt wood to fall into the center area 110 defined by the frame 102, which in turn can be used to heat food and drinks.

Figure 3:
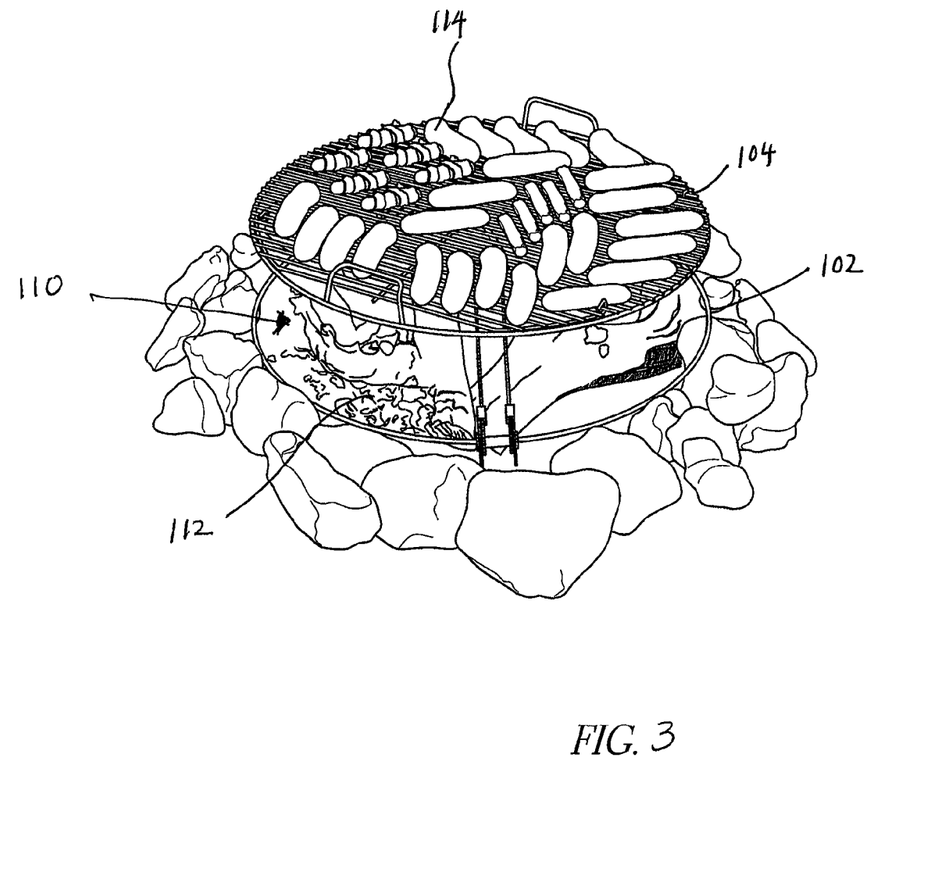
FIGS. 3 and 4 illustrate the outdoor cooking and firewood support apparatus of FIG. 1 being used with the cooking grate to cook and heat food and drinks.
Figure 4:
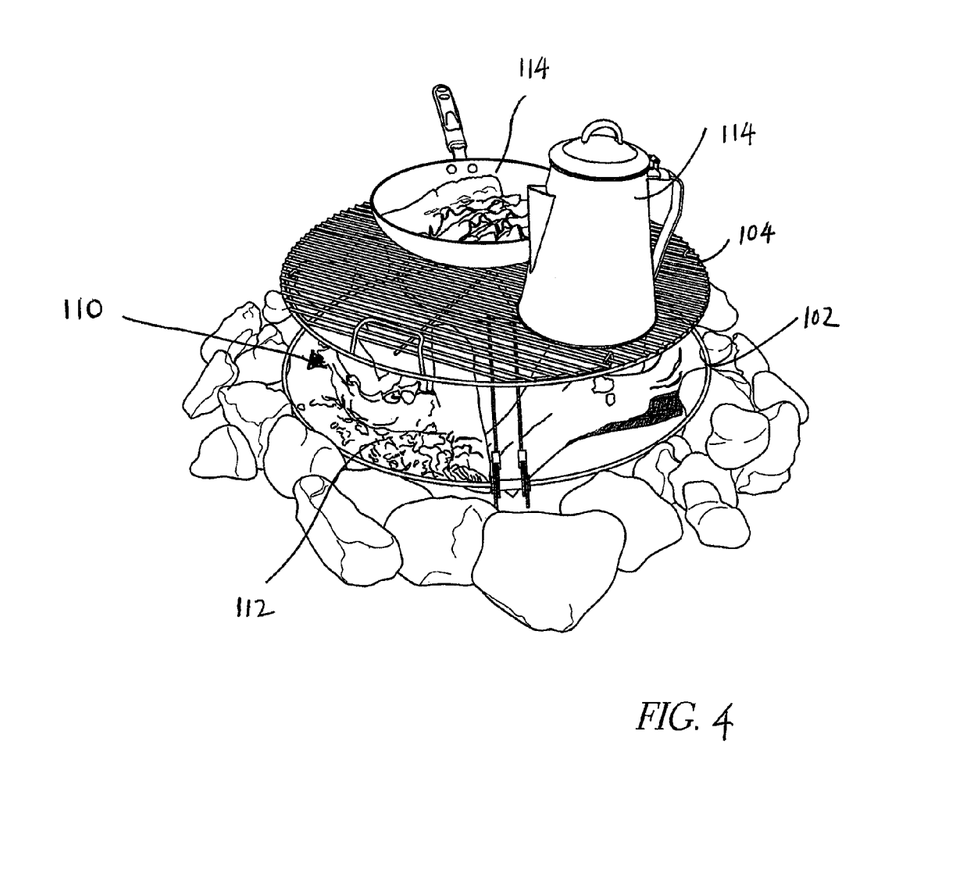

As shown in FIGS. 3 and 4, the cooking grate 104 is attached to the top of the frame 102 after the wood has been burnt. Smoldering coal 112 from the burnt wood is disposed in the center area 110 underneath the cooking grate 104 and can be used to barbeque or heat food and drinks 114 placed on the cooking grate 102.

Figure 5:
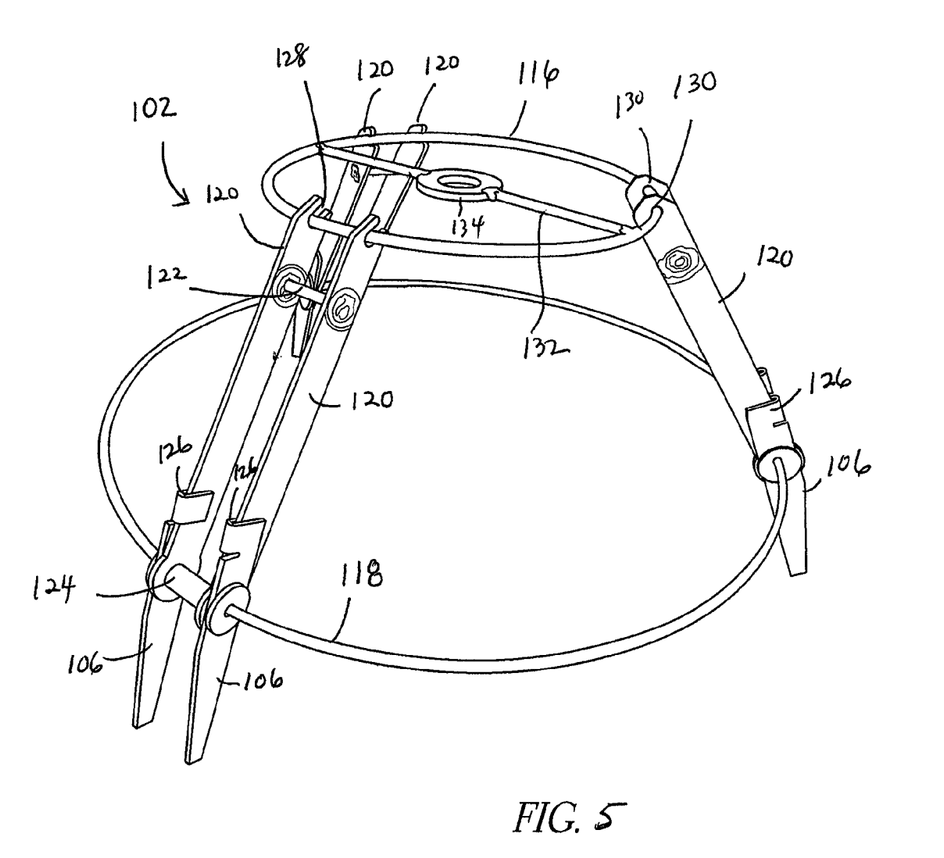
FIG. 5 illustrates a frame of the outdoor cooking and firewood support apparatus according to one embodiment of the present invention.

FIG. 5 illustrates the apparatus 100 in greater detail. As shown in FIG. 5, the frame 102 generally includes an upper frame member 116, a lower frame member 118, a plurality of arms 120 interconnecting and affixing the upper and lower frame members in a spaced apart relationship. In one implementation, the upper and lower frame members have substantially circular configurations. In another implementation, one or both of the frame members comprise a ring structure. In other implementations, the frame members can take on other shapes and configurations such as triangular, square, hexagonal, or the like. The cross-sectional area of the upper frame member 116 is smaller than the cross-sectional of the lower frame member 118 such that the arms 120 extend between the frame members in a converging manner. In a preferred implementation, the upper frame member comprises a metal ring structure having a diameter of between about 6 to 10 inches, and the lower frame member also comprises a metal ring structure having a diameter of between about 14 to 22 inches. In another preferred implementation, the distance between the upper and lower frame members is between about 4 to 18 inches, preferably between about 4 to 6 inches. In certain embodiments, the upper frame member 116 further comprises a center support rod 132 and a washer 134 adapted to couple with the cooking grate.

Figure 6:
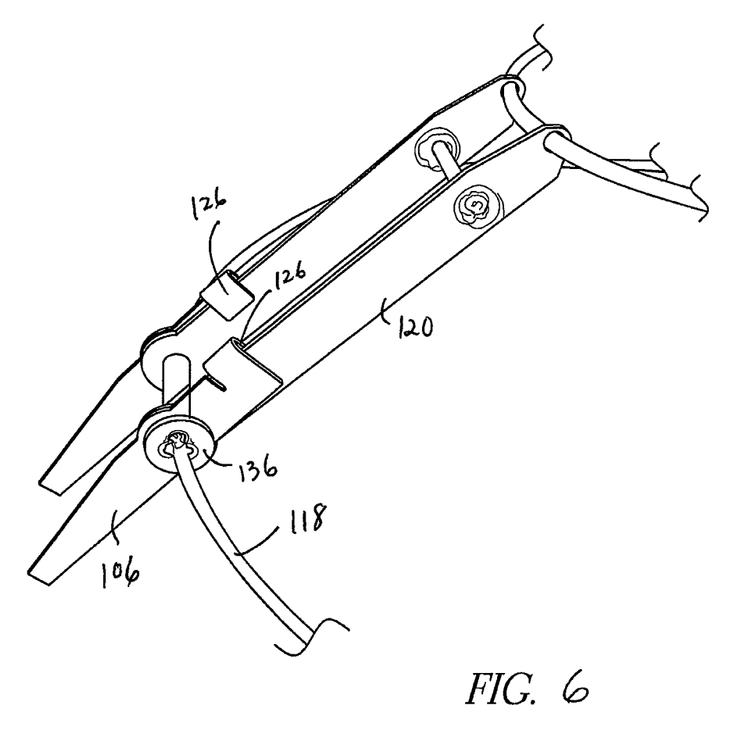
FIG. 6 illustrates a detailed view of the manner in which the leg engages with the arm of the apparatus shown in FIG. 5.

In some implementations, a plurality of arms 120 are grouped into sets of two, with the sets of arms being evenly spaced around the frame members, such as metal rings, as shown in FIG. 5. The arms 120 in each set are positioned in a parallel arrangement and joined together by an upper spacer 122 and a lower spacer 124. The upper spacer 122 can be made of a rod and the lower spacer 124 can be made of a tube for the lower frame member 118 can extend through. In one implementation, the arms in each set are separated by about 1 to 2 inches. Preferably, the upper end of each arm 120 is rotatably coupled to the upper frame member 116 and the lower end of each arm 120 is rotatably coupled to the lower frame member 118. In one implementation, each leg 106 of the apparatus is also rotatably coupled to the lower frame member 118 and has a radius clip portion 126 adapted to receive a lower side edge of the arm 120. FIG. 6 provides a detailed view of the manner in which the clip portion 126 of the leg 106 engages with the lower end of the arm 120. As also shown in FIG. 6, washers 136 can be used at the joint area of the leg 106, arm 120, and lower frame member 118.

In another implementation, two sets of the arms are detachably coupled to the upper frame member 116 via an open slot 128 located on the upper end of the arm 120a, and one set of the arms 120b is affixed to the upper frame member 116 through openings 130 formed in the upper end of the arm. The detachable arms are designed to be detached from the upper frame member so the apparatus can be flattened into a collapsed configuration when it is not in use. The affixed arms are designed to keep the upper and lower frame members together when the apparatus is in a collapsed configuration.

Figure 7:
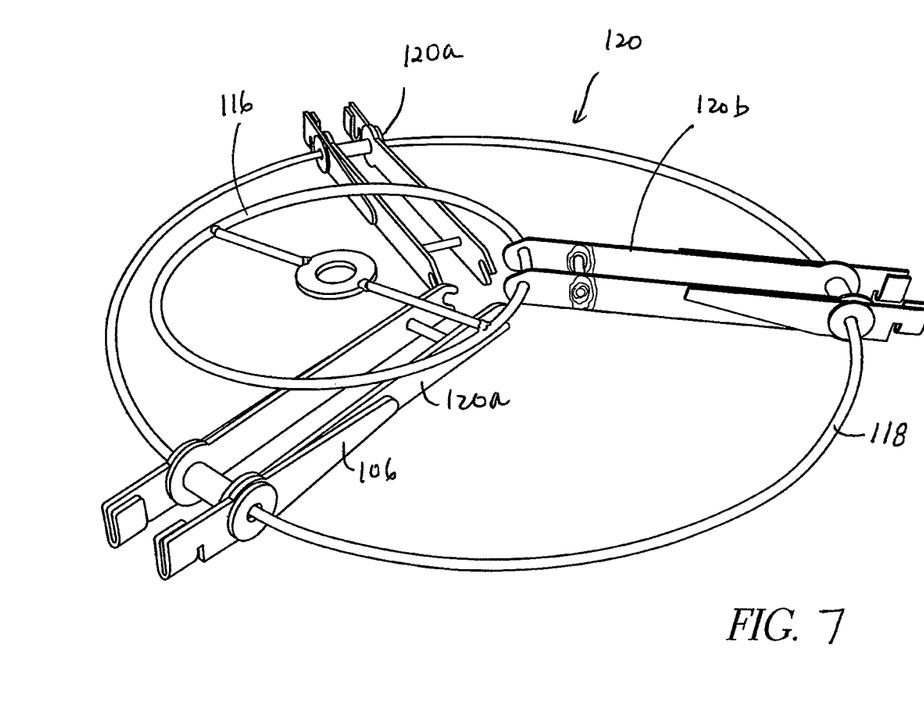
FIG. 7 illustrates an outdoor cooking and firewood support apparatus of FIG. 1 in a retracted configuration according to one embodiment of the present invention.

FIG. 7 illustrated the apparatus in a collapsed or retracted configuration. As shown in FIG. 7, the arms 120a that are detachably attached to the upper frame member are removed from the upper frame member, causing the frame 102 to flatten into a collapsed configuration. The set of arms 120b that are affixed to the upper frame member 116 keeps the upper and lower frame members 116, 118 together. Additionally, the lower part of each leg 106 is rotated upward toward the arm 120a, b so as to further reduce the footprint of the apparatus.

Figure 8:
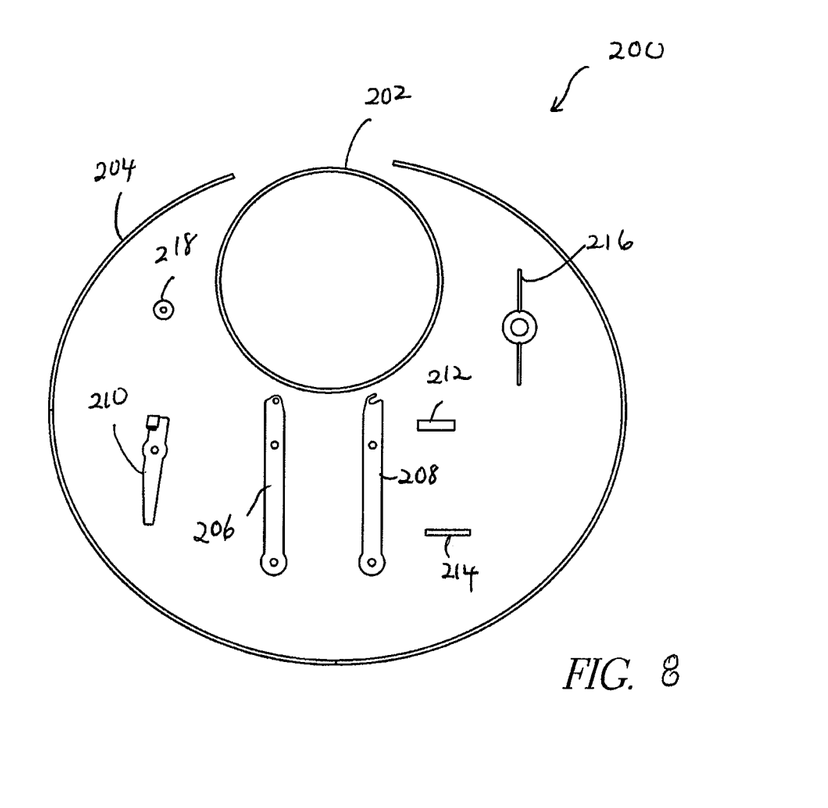
FIG. 8 illustrates a kit comprising components adapted to be assembled into an outdoor cooking and firewood support apparatus according to one embodiment of the present invention.

FIG. 8 illustrates a kit 200 comprising components adapted to be assembled into a combination outdoor cooking and firewood support apparatus of one embodiment of the present invention. As shown in FIG. 8, the kit 200 generally comprises a smaller metal ring 202, a larger metal ring 204 in an open configuration, four closed arms 206, two open ended arms 208, three legs 210, three spacer rods 212, three spacer tubes 214, six washers 218, and a center rod and washer for the cooking grate 216. It will be appreciated that the number of each component can vary without deviating from the spirit of the invention. The components can be made of metal or other high temperature resistant material.

Figure 9:
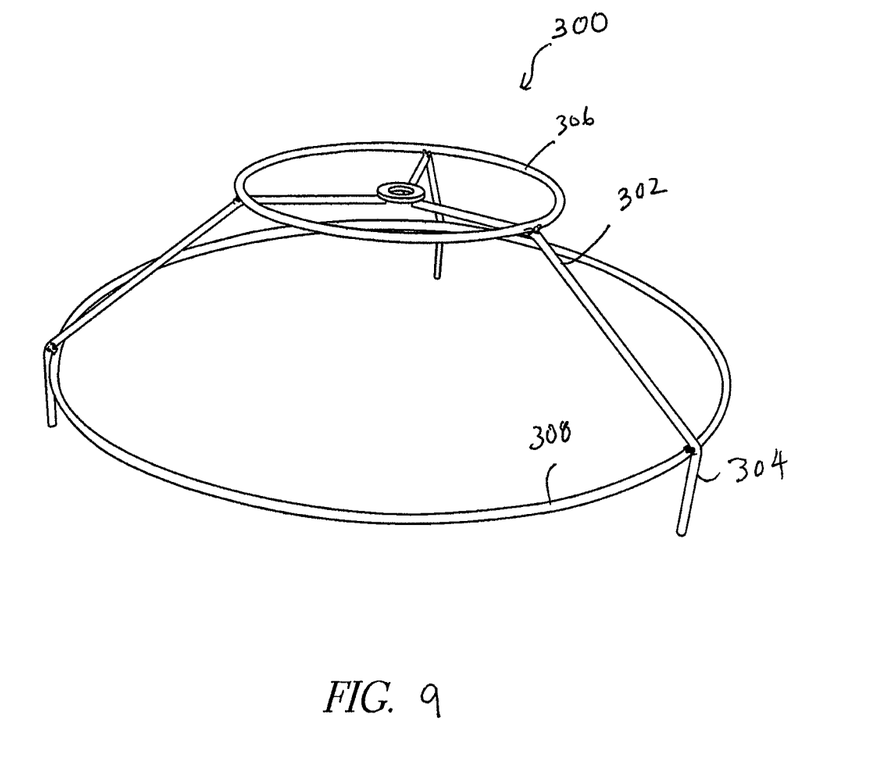
FIG. 9 illustrates an outdoor cooking and firewood support apparatus according to another embodiment of the invention.

FIG. 9 illustrates an outdoor cooking and firewood support apparatus 300 according to another embodiment of the invention. The apparatus 300 includes a plurality of arms 302 and legs 304 that are fixedly attached to upper and lower ring members 306, 308 forming a generally frusto-conical frame structure. Firewood logs can be placed along the periphery of the upper and lower ring members and be supported by the ring members so that they do not collapse onto each other while burning. The parts of the apparatus 300 shown in FIG. 9 can be welded together or attached by other known methods.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separated from others.

What is claimed is:

1. An outdoor cooking and firewood support apparatus comprising:
a frame adapted to support firewood in a substantially upright orientation along an exterior periphery of the frame and facilitate burnt firewood to fall toward the center of the frame, said frame comprising an upper frame member, a lower frame member with a larger diameter than the upper frame member, and a plurality of arms joining the upper and lower frame members, wherein the arms are pivotable about at least one of the frame members and at least one of the arms is detachable, said upper and lower frame members are arranged in a spaced apart relationship so as to define an opening therebetween, wherein the upper and lower frame members together define an interior area, wherein the frame can be retracted into a flattened configuration such that the interior area is substantially reduced and the upper and lower frame members can be positioned in substantially the same plane when one of the arms is detached from at least one of the frame members, wherein another one of the arms is pivotably attached to both the upper and lower frame members when the frame is retracted into a flattened configuration.

2. The apparatus of claim 1, further comprising a cooking grate wherein the cooking grate is adapted to be positioned on an upper surface of the frame over the interior area of the frame.

3. The apparatus of claim 1, wherein at least some of the plurality of arms are detachable from the upper frame member.

4. The apparatus of claim 1, wherein at least some of the plurality of arms are fixedly attached to one of the frame members when the frame is in the flattened configuration.

5. The apparatus of claim 1 further comprising a plurality of legs, said legs are rotatably coupled to the lower frame member and engage with a lower end of the arms.

6. The apparatus of claim 1, wherein the upper and lower frame members each comprising a ring.

7. The apparatus of claim 1, wherein the lower frame member has a larger cross-sectional area than the upper frame member.

8. The apparatus of claim 1, wherein coal from burning of the firewood are directed to the interior area and can be used to heat food and drinks on the cooking grate.

9. A combination outdoor cooking and firewood support apparatus comprising:
a frame adapted to support firewood in a substantially upright orientation along the exterior periphery of the frame, wherein the firewood leans inwardly toward the center of the frame, the frame having an upper ring and a lower ring, wherein the lower ring has a greater diameter than the upper ring thereby defining an upper opening and sloped side openings to allow a substantial amount of burnt firewood to fall naturally through the openings in an interior area of the frame;
a cooking grate adapted to be positioned on an upper surface of the frame, over the upper opening and interior area;
a plurality of arms positioned between the upper ring and the lower ring, wherein at least some of the arms are pivotably attached to both the upper ring and the lower ring;
and wherein the frame can be collapsed into a flattened configuration such that the upper and lower rings are in a substantially planar concentric arrangement when the apparatus is not in use, wherein at least one of the arms remains pivotably attached to both the upper ring and the lower ring when the frame is in a flattened configuration.

10. The apparatus of claim 9 further comprising a plurality of legs, wherein each leg is pivotably attached to an end portion of one of the plurality of arms.

* * * * *